United States Patent
Yurgil

(10) Patent No.: US 7,388,362 B2
(45) Date of Patent: Jun. 17, 2008

(54) BI-MODAL VOLTAGE LIMIT CONTROL TO MAXIMIZE ULTRA-CAPACITOR PERFORMANCE

(75) Inventor: James R. Yurgil, Livonia, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/191,245

(22) Filed: Jul. 27, 2005

(65) Prior Publication Data

US 2007/0024266 A1    Feb. 1, 2007

(51) Int. Cl.
G01R 31/26    (2006.01)
(52) U.S. Cl. .................. 324/76.11; 324/658
(58) Field of Classification Search ......... 324/76.11, 324/658
See application file for complete search history.

(56) References Cited

U.S. PATENT DOCUMENTS

2005/0052165 A1* 3/2005 Willner et al. ............ 323/266

2006/0221516 A1* 10/2006 Daboussi ................... 361/18

FOREIGN PATENT DOCUMENTS

| DE | 102005032507 A1 | 2/2002 |
| DE | 10116463 A1 | 10/2002 |
| DE | 102005034588 A1 | 2/2007 |

OTHER PUBLICATIONS

U.S. Appl. No. 10/891,474, filed Jul. 14, 2004.

* cited by examiner

*Primary Examiner*—Vincent Q Nguyen

(57) ABSTRACT

An electrical system that is operable to selectively provide electrical power to power a load includes an ultra-capacitor that selectively stores and discharges electrical power and a control module that determines an operating ratio based an ON power state and an OFF power state of the ultra-capacitor. The control module calculates a voltage limit of the ultra-capacitor based on the operating ratio and regulates operation of the ultra-capacitor based on the voltage limit.

23 Claims, 6 Drawing Sheets

BI-MODAL VOLTAGE LIMIT CONTROL TO MAXIMIZE ULTRA-CAPACITOR PERFORMANCE

FIELD OF THE INVENTION

The present invention generally relates to energy storage devices, and more particularly, to achieving a targeted operating lifespan of ultra-capacitor energy storage devices.

BACKGROUND OF THE INVENTION

Electric, fuel cell, and hybrid vehicles include electric drive motor(s) that selectively drive wheels of the vehicle. An energy storage device is provided to store energy that is used to power the electric drive motor(s). Energy storage devices such as ultra-capacitors may be used to provide short bursts of power that may be required during vehicle operation. For example, energy stored in an ultra-capacitor may be used for engine start and stop operation, launch assist and/or regenerative braking.

When implementing an ultra-capacitor, it is important to determine the remaining useful life of the ultra-capacitor energy storage device. FIG. 1 shows an exemplary plot of the instantaneous projected life (Y) of an ultra-capacitor cell as a function of the cell voltage (V) for varying cell temperatures (T). The exemplary plot includes Y at temperatures of 15° C., 25° C., 35° C., 45° C., 55° C. and 65° C. These plots can be expressed according to the following relationship:

$$Y(V,T) = 10^{(aT+bV+c)} \quad [1]$$

where a, b, and c are constants. When Y(T,V) is expressed in years, V in volts and T in ° C., a=−0.03333333, b=−3.33333333 and c=10.1666666666 are useful values.

While the above expression is useful in providing a snapshot of projected lifespan for a variety of specific cell conditions, it does not reflect a projected life based on the cumulative effects of history of operation, nor present time varying cell conditions. Further, neither FIG. 1, nor the expression it represents, defines the method for limiting the ultra-capacitor voltage for the purpose of achieving a desired operating lifespan. Thus a need continues to exist for an improved means and method for optimizing the useful voltage range of an ultra-capacitor power source while achieving a desired operating lifespan over varying in-use operating intervals, especially as an energy storage device for vehicles.

SUMMARY OF THE INVENTION

Accordingly, the present invention provides an electrical system that is operable to selectively provide electrical power to power a load. The electrical system includes an ultra-capacitor that selectively stores and discharges electrical power and a control module that determines an operating ratio based an ON power state and an OFF power state of the ultra-capacitor. The control module calculates a voltage limit of the ultra-capacitor based on the operating ratio and regulates operation of the ultra-capacitor based on the voltage limit.

In other features, the control module calculates the voltage limit based on a target life expectancy ($Y_{target}$) of the ultra-capacitor. The $Y_{target}$ is equal to one of a minimum allowed life expectancy ($Y_{operating}$) and a minimum needed life expectancy ($Y_{idle}$) based on the power states of the ultra-capacitor.

In another feature, the control module calculates a temporary ratio as a ratio between an operating time and a total time. The operating ratio is set equal to the temporary ratio if a previous value of the operating ratio is less than the temporary ratio.

In another feature, the control module calculates a temporary ratio as a ratio between an operating time and a time threshold. The operating ratio is set equal to the temporary ratio if a previous value of the operating ratio is less than the temporary ratio.

In still another feature, the electrical system further comprises a temperature sensor that is responsive to a temperature of the ultra-capacitor. The voltage limit is calculated based on the temperature.

In yet another feature, the control module determines whether a power state of the ultra-capacitor is transitioning from the ON state to the OFF state and calculates the operating ratio as a ratio between an operating time and a total time when the power state is transitioning from the ON state to the OFF state and said total time is greater than a threshold time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
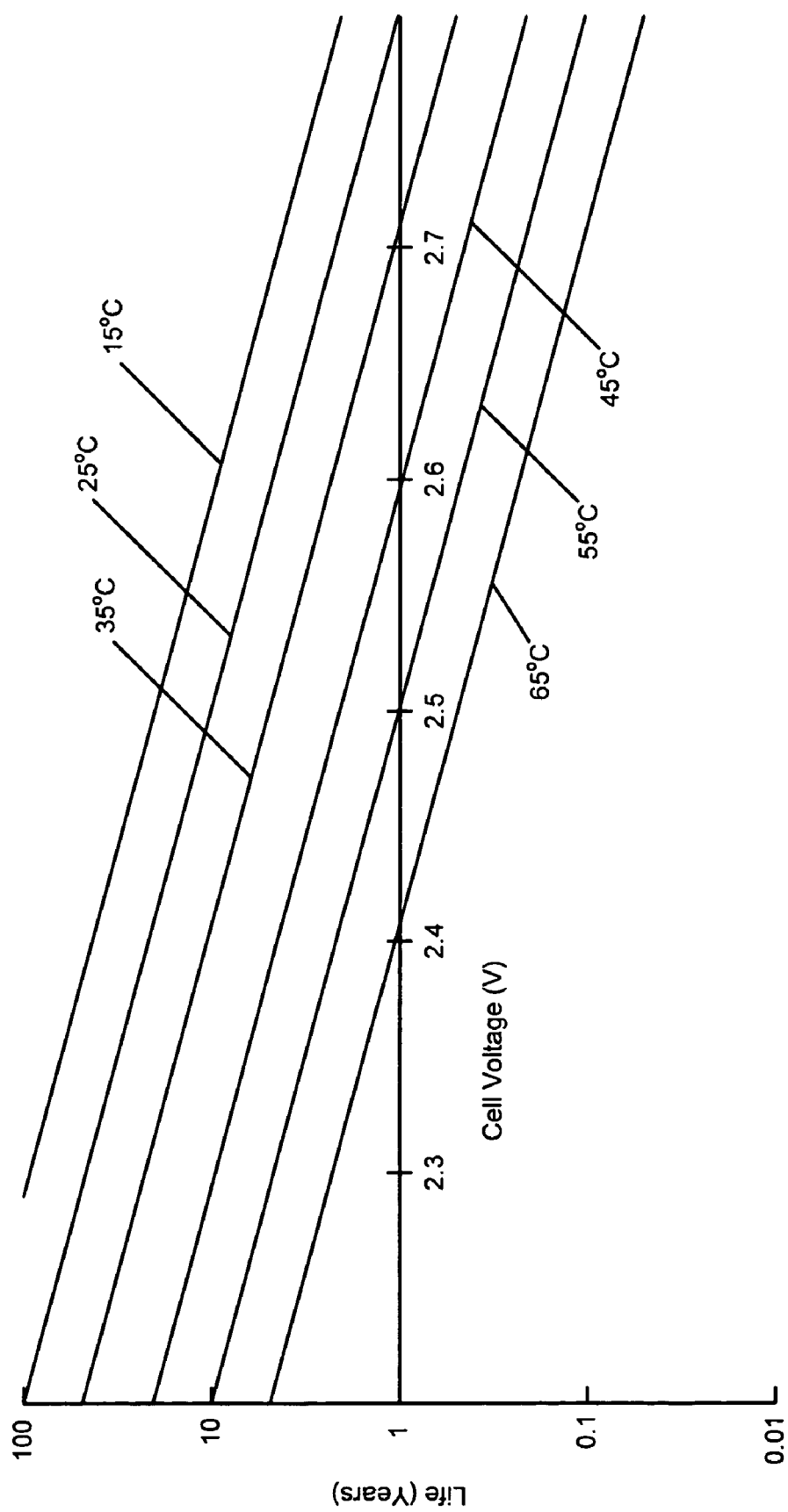
FIG. 1 is a simplified plot of the instantaneous ultra-capacitor predicted life in years versus cell voltage in volts, with temperature in ° C. as a parameter, according to the prior art.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. The words "idle" or "idle state" or "idle period" or "OFF" are used interchangeably herein to indicate the state or period where no significant power is being drawn from the ultra-capacitor and the words "run" or "run-state" or "run period" or "ON" are used interchangeably to indicate that significant power is being drawn from the ultra-capacitor.

Figure 2:
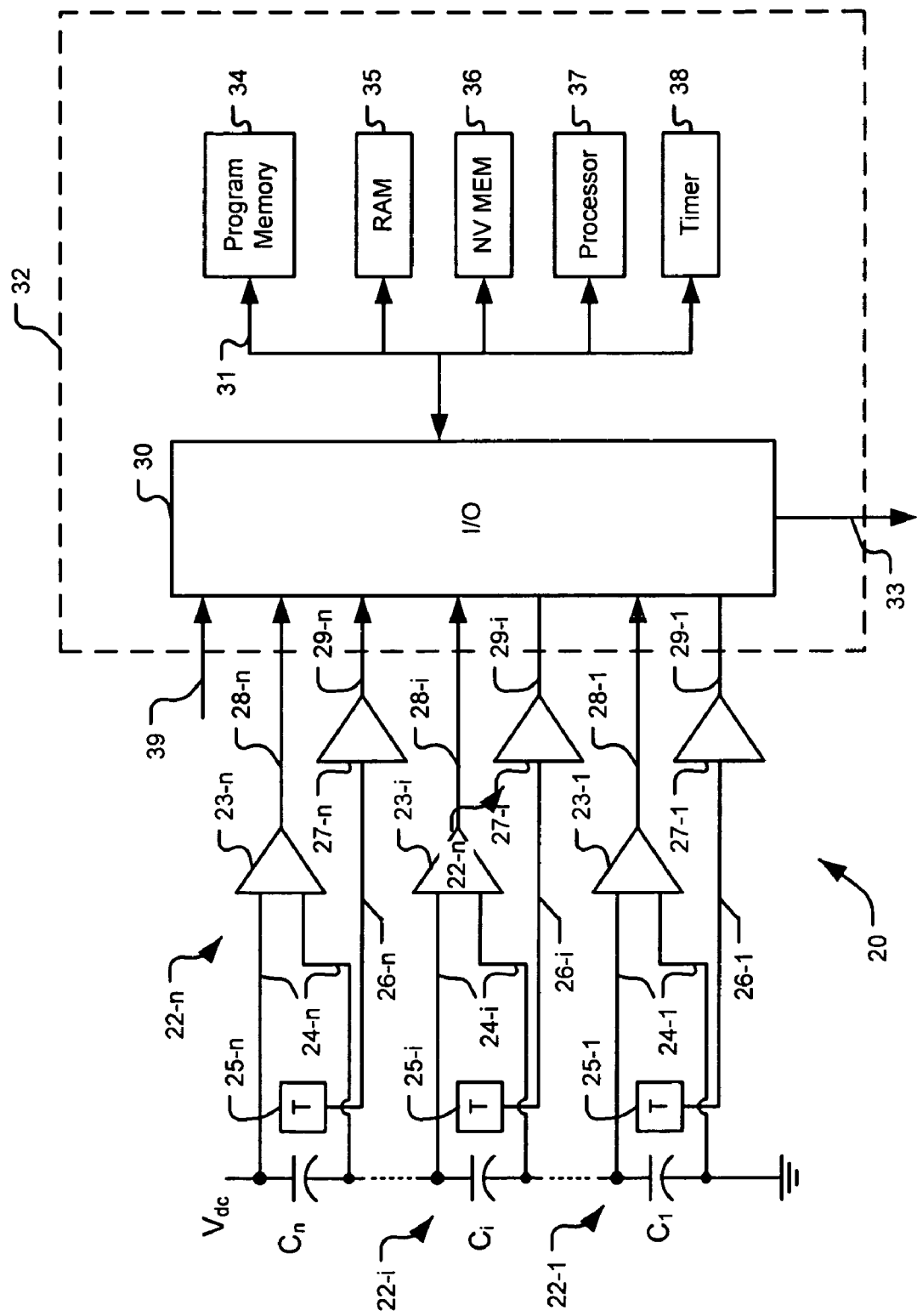
FIG. 2 is a simplified electrical schematic block diagram of an ultra-capacitor system according to the present invention.
Figure 3:
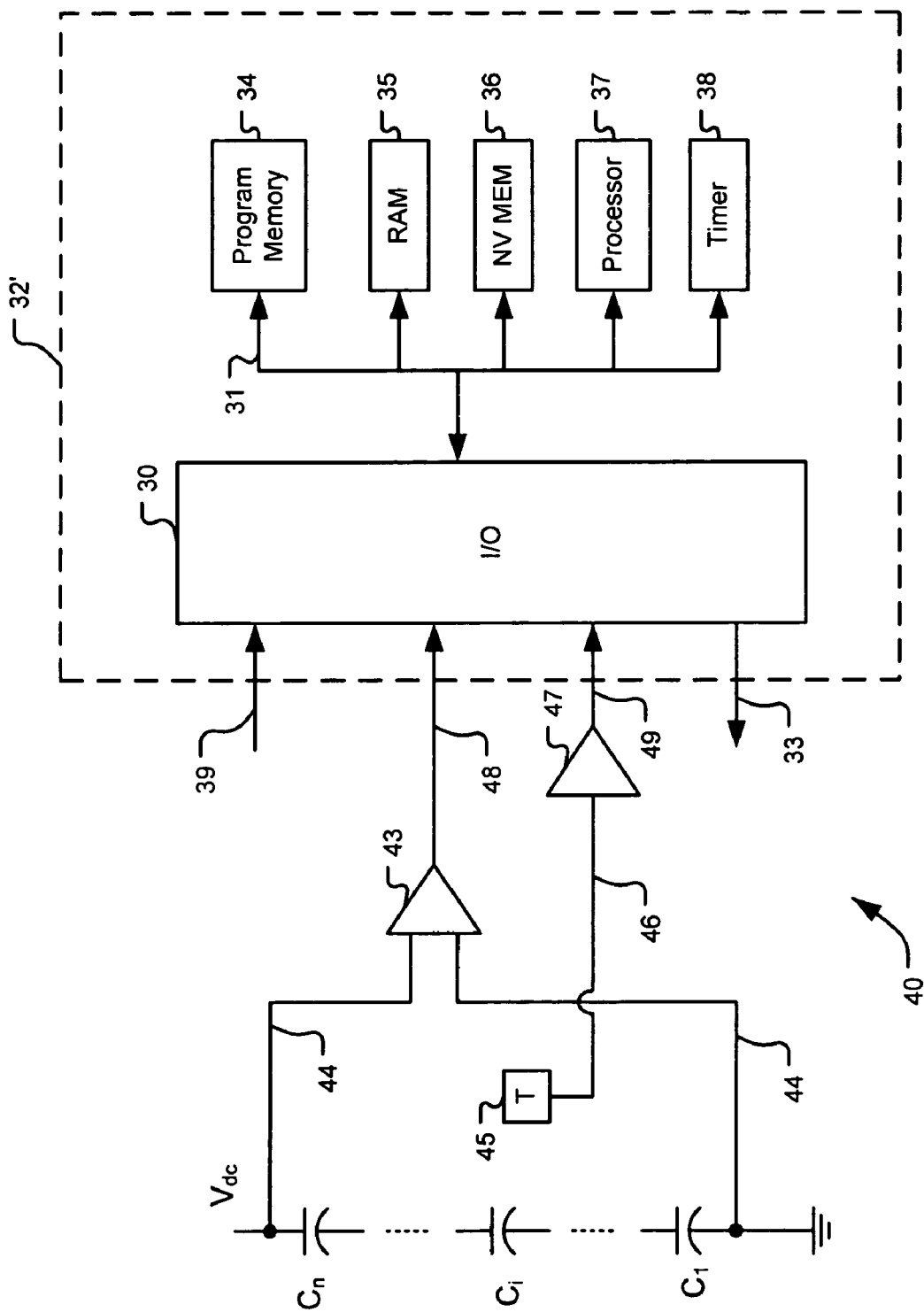
FIG. 3 is a simplified electrical schematic block diagram of an alternative ultra-capacitor system according to the present invention.

Referring now to FIGS. 2 and 3, simplified electrical schematic block diagrams of electrical systems 20 and 40, respectively, are illustrated. The electrical systems 20,40 are described in detail in U.S. patent application Ser. No. 10/891,474, filed on Jul. 14, 2004, the disclosure of which is expressly incorporated herein. With particular reference to FIG. 2, the electrical system 20 determines the projected life of an ultra-capacitor. More specifically, the electrical system 20 comprises one or more ultra-capacitors C1 ... Ci ... Cn and capacitor status sensors 22-1 ... 22-i ... 22-n that measure the voltage Vi across each capacitor C-i and temperature Ti of each capacitor Ci.

For convenience of explanation, the arrangement is described in terms of a representative capacitor C and a representative status sensor 22, with the subsidiary identification "i" omitted. Each status sensor 22 comprises an isolation differential amplifier and a level shifter or isolator 23 having differential voltage inputs 24 coupled across capacitor C. A level shifting amplifier or isolator 27 has an input 26 coupled to a temperature sensor 25, which is thermally coupled to the capacitor C so as to measure the temperature thereof. The output of the isolator 23 on a lead or bus 28 and the output of the isolator 27 on a lead or bus 29 are coupled to an I/O 30 of a measuring system 32. The I/O 30 may be an analog to digital converter (A/D) and or a digital converter or signal translator depending upon the nature of the output signals from isolators 23, 27.

The measuring system 32 further includes a program memory 34, a temporary working memory (RAM) 35, a non-volatile memory (NV-MEM) 36, a processor (CPU) 37 and a timer 38, coupled to each other and to the I/O 30 via a bus 31. The ultra-capacitor voltage limit control of the present invention is executed by the processor 37. The NV-MEM 36 is used to temporarily store intermediate values of various variables or parameters. An output bus or link 33 enables the electrical system 20 to communicate the results of its evaluation of the status of capacitors C1 ... Ci ... Cn and the predicted life and/or any desired intermediate values to one or more displays, alarm functions, and/or other overall or supervisory vehicle functions. An input link 39 is provided so that power-up and power-down signals can be received from, for example, an ignition switch (not shown) or other vehicle or power source control device.

With particular reference to FIG. 3, a block diagram of the electrical system 40 is illustrated. The electrical system 40 is analogous to the electrical system 20 of FIG. 2. Electrical systems 20 and 40 differ in that electrical system 20 uses multiple capacitor status sensors 22 to separately measure the status of the various capacitors C1 ... C-n. The electrical system 40 includes a single capacitor status sensor 42 that measures the collective status of capacitors C1 ... C-n in series and reports the combined data to a measuring system 32'. The status sensor 42 is analogous to the status sensor 22 and elements 43-49 of the status sensor 42 are equivalent in operation to elements 23-39 of the status sensor 22. The components of the measuring system 32' are analogous to those of the measuring system 32.

The discussion that follows concerning the operation of the electrical systems 20, 40 applies to either arrangement. For convenience of explanation, it is assumed that electrical system 20 of FIG. 2 is being used and that only a single cell is being considered. Persons of skill in the art will understand based on the description herein that multiple cells may also be considered using the arrangement of the electrical system 20, the electrical system 40 or a combination of the two.

As described in detail in U.S. patent application Ser. No. 10/891,474, the projected life-span ($Y_{proj}$) of the ultra-capacitor is determined according to the following equation:

$$Y_{proj}=Y_{exp}/\{\Sigma[t_s/Y(V(t_n),T(t_n))]+\Sigma(\Delta t/Y_{off})\} \qquad [2]$$

Equation 2 describes the operating conditions (i.e. terminal voltage (V) and temperature (T)) and the operating state period on the present projected life-span of the ultra-capacitor. During the operating time interval (i.e., power is ON), the state of the ultra-capacitor is desirably sampled every $t_s$ seconds and therefore the number n=1, 2, 3, ... N of sampling intervals is a measure of the total operating time and $t_n$ is the product of n and $t_s$.

Figure 4:
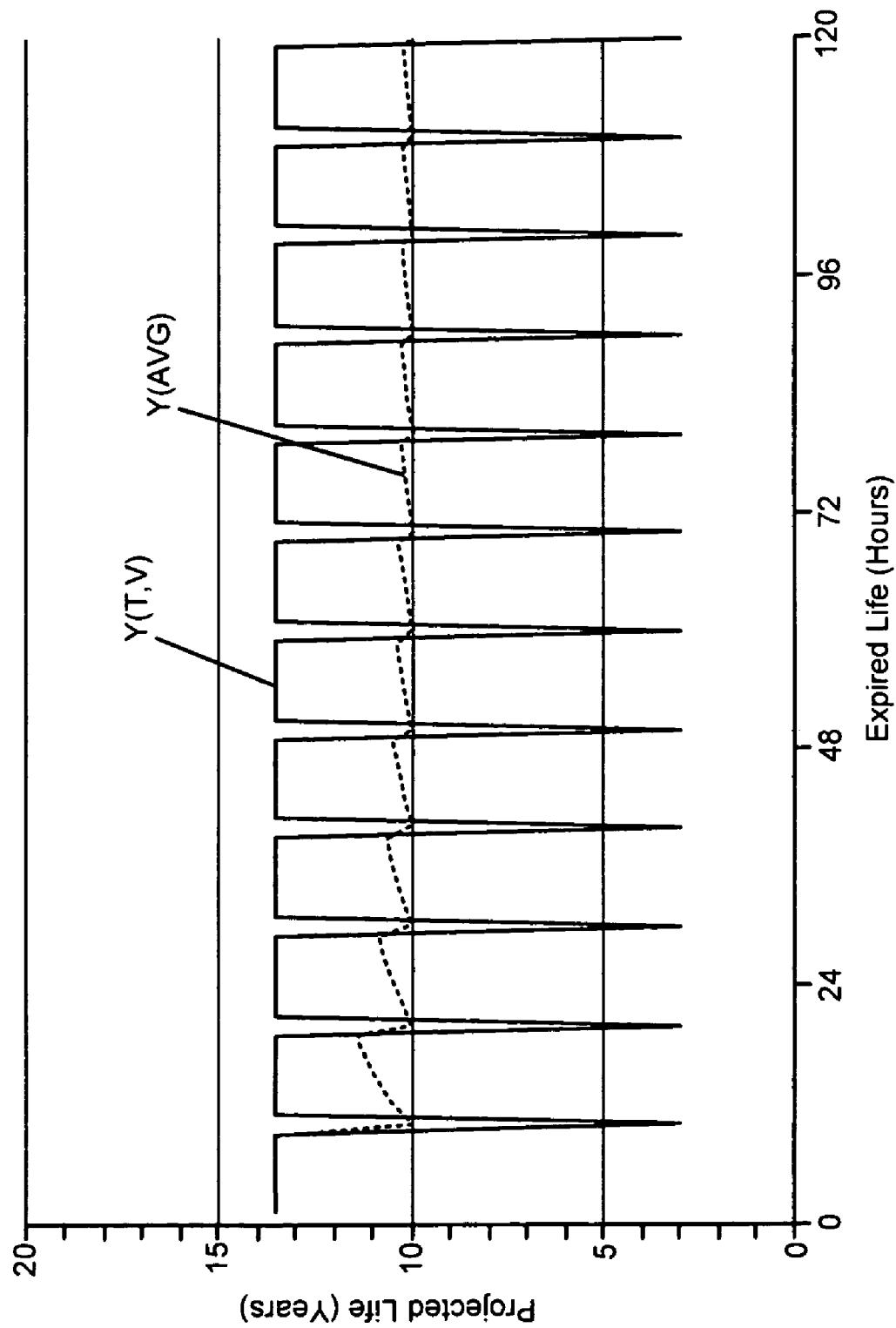
FIG. 4 is a graph of projected life of the ultra-capacitor as a function of elapsed time with a 10% operating period.

Referring now to FIG. 4, the projected life of an exemplary ultra-capacitor as a function of elapsed time with a 10% operating period is illustrated. A projected lifespan and instantaneous expected life are plotted against predicted life in years versus elapsed time in hours. Essentially the projected lifespan is a time weighted output of the instantaneous expected life, Y(T,V). Initially while in the idle mode, both the projected lifespan and instantaneous expected life of the ultra-capacitor is at its highest level. However, when the ultra-capacitor is switched to the operating mode the instantaneous expected life severely decreases due to higher mean operating voltage, or temperature, or both. As the ultra-capacitor switches from the idle mode to the operating mode, the projected lifespan decreases according to Equation 2. Conversely, as the ultra-capacitor switches from the operating mode to the idle mode, the projected lifespan increases according to Equation 2. The trend of sharp drop in projected life during operation and then partial recovery while in the idle mode is mitigated by the passage of time. As time continues the projected lifespan converges to the targeted design life.

Figure 5:
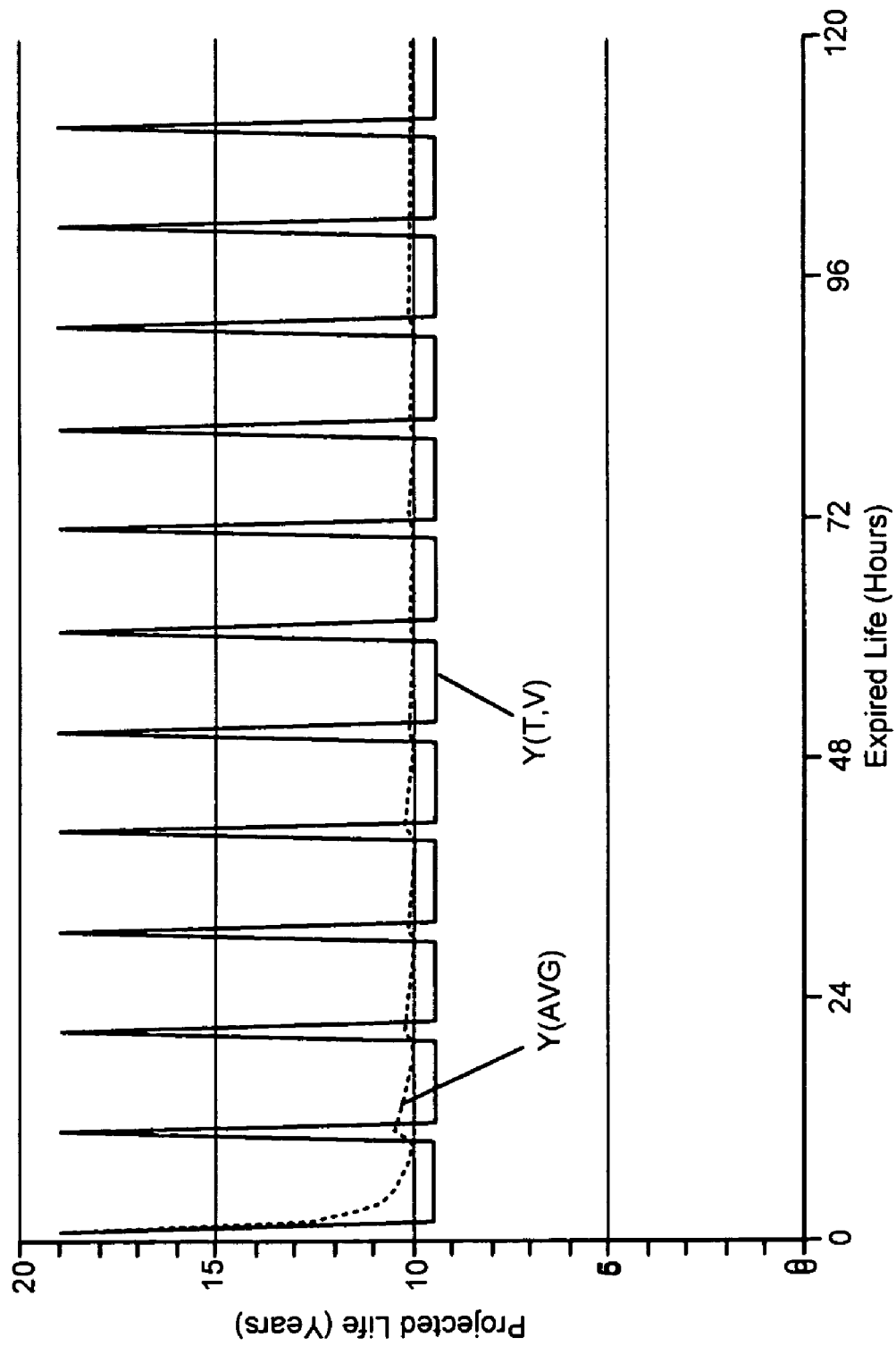
FIG. 5 is a graph of projected life of the ultra-capacitor as a function of elapsed time with a 90% operating period.

Referring now to FIG. 5, the projected life of an ultra-capacitor as a function of elapsed time with 90% operating period is illustrated. The axes in this figure are similar to that of FIG. 4. The characteristics of the instantaneous expected life vary from those associated with the 10% operating period. When the ultra-capacitor is operating 90% of the time, the instantaneous expected life for both the idle operation and the in-use operation are elevated relative to that of the relationship in FIG. 4. The projected lifespan tracks the instantaneous expected life according to Equation 2. FIGS. 4 and 5 illustrate that the same life expectancy can be reached, despite varying in-use conditions, by controlling of the instantaneous expected life as a function of the operating state and in-use operating period.

For a fixed capacitance, increasing the operating voltage range of the ultra-capacitor increases its energy storage but temporarily reduces the expected life of the device. Conversely, the maximum voltage of the ultra-capacitor can be reduced to increase the instantaneous expected life of the device. However, because the maximum voltage is reduced, the energy that is stored by the ultra-capacitor is also reduced for a system with fixed capacitance. This energy relationship may be characterized by the following equation:

$$w_c = \frac{1}{2} * C * V^2 \quad [3]$$

where $w_c$ is energy stored in Joules, C is capacitance and V is voltage. Maximum system energy needs and the system operating voltage define the minimum required capacitance and cost of the system. Because the ultra-capacitor has both operating and non-operating periods, the ultra-capacitor voltage limit control of the present invention provides an opportunity to temporarily operate at a higher voltage than would be allowed with just a continuous or single operating mode. Accordingly, the capacitance and cost of the system can be minimized. Non-operating periods at reduced voltage (i.e., increased life expectancy) can be used to mitigate the undesired effects of higher operating voltage (i.e., reduced life expectancy).

In-use operation of the ultra-capacitor varies on a per-operator basis. Therefore, it is expected that the operating period ($\Sigma t_s$) and the idle period ($\Sigma \Delta t$) and the ratio of $\Sigma t_s$ to $\Sigma \Delta t$ or the cumulative sum of the two periods will vary from operator to operator. The ultra-capacitor voltage limit control of the present invention provides performance benefits by establishing a separate target life and cell voltage limit based on the operating and idle periods. Further benefits are realized by adjusting the state-related voltage limits based on the ratio of the operating period to the idle period. These performance benefits can be obtained without compromising the in-use lifespan of the system as long as an appropriate control method based on the feedback of these parameters is implemented.

The ultra-capacitor voltage limit control of the present invention provides a ratio ($\alpha$) of the operating period ($\Sigma t_s$) to the sum of the idle period ($\Sigma \Delta t$) and the operating period ($\Sigma t_s$), according to the following relationship:

$$\alpha = \Sigma t_s/(\Sigma t_s + \Sigma \Delta t) \quad [4]$$

As a result, $\alpha$ represents the fractional portion of operation. Therefore, the value (1−$\alpha$) represents the fractional portion associated with the non-use or idle period. Using $\alpha$ and information on current operating conditions, an appropriate maximum set-point ultra-capacitor cell voltage limit ($V_{limit}$) can be determined. $V_{limit}$ is the voltage that can be tolerated if the minimum design life target of the ultra-capacitor is to be met.

$Y_{proj}$ can be defined as a function of $\alpha$ according to the following relationship:

$$Y_{proj} = Y_{exp}/\{\alpha * Y_{exp}/Y_{operating} + (1-\alpha) * Y_{exp}/Y_{idle}\} \quad [5]$$

or $$Y_{proj} = 1/\{\alpha/Y_{operating} + (1-\alpha)/Y_{idle}\} \quad [6]$$

and $$1/Y_{proj} = \alpha/Y_{operating} + (1-\alpha)/Y_{idle} \quad [7]$$

By assuming that the independent variable is $Y_{operating}$, the dependent variable is $Y_{idle}$. By rearranging equation 7, the following relationships are provided:

$$Y_{idle} = [(1-\alpha)/\alpha] * Y_{operating}/\{[Y_{operating}/(\alpha * Y_{proj})] - 1 \quad [8]$$

for $0 < \alpha < 1$; and $$Y_{idle} = Y_{operating} = \text{Design Life} \quad [9]$$

for $\alpha = 1$ or $\alpha = 0$ $Y_{proj}$ is the targeted design life, $Y_{operating}$ is the minimum allowed life expectancy if operating for the stated fraction of time and $Y_{idle}$ is the minimum required life expectancy for the stated fraction of time.

The ultra-capacitor voltage limit control limits the maximum voltage of the ultra-capacitor to $V_{limit}$ provide a minimum $Y(V,T) > Y_{operating}$ during operating periods and limits the maximum voltage of the ultra-capacitor to ensure $Y(V,T) > Y_{idle}$ during idle periods. $V_{limit}$ is determined based on the following relationship:

$$V_{limit} = [c + aT - \log(Y_{target})]/-b \quad [10]$$

which is derived from equation 1, provided above. Exemplary values of the coefficients a, b and c include −0.03333333, −3.33333333 and 10.16666666, respectively. $Y_{target}$ is equal to $Y_{operating}$ during the operating period and is equal to $Y_{idle}$ during the idle period.

Figure 6:
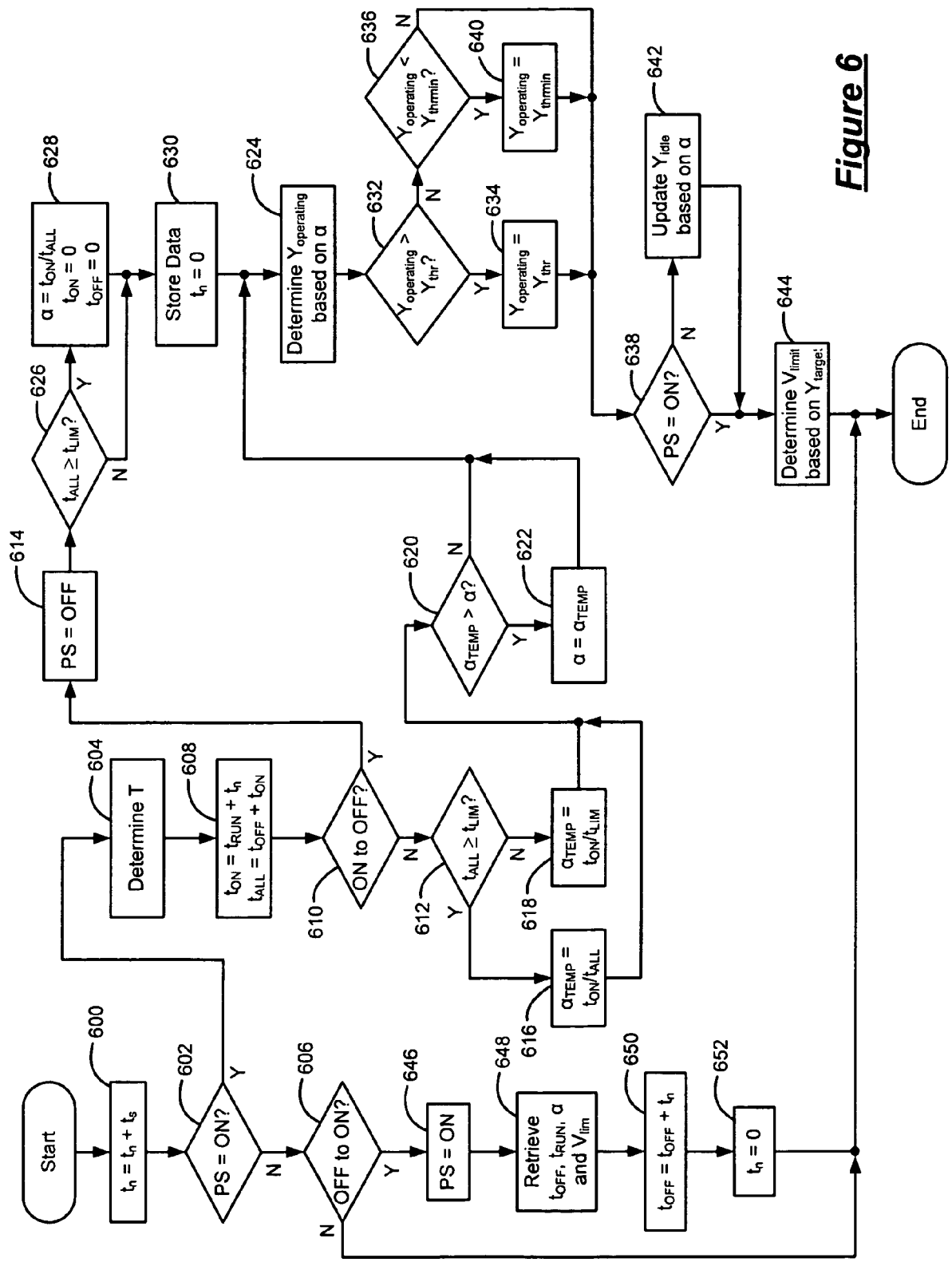
FIG. 6 is a flowchart of steps performed by the ultra-capacitor voltage limit control of the present invention.

Referring now to FIG. 6, steps performed by the ultra-capacitor voltage limit control will be described in detail. In step 600, control increments $t_n$ by $t_s$. In step 602, control determines whether the power state (PS) is ON. If the PS is ON, control continues in step 604. If the PS is not ON, control continues in step 606. Control determines the ultra-capacitor temperature (T) in step 604. In step 608, control determines an ON time ($t_{ON}$) as the sum of a run time ($t_{RUN}$) and $t_n$ and a cumulative time ($t_{ALL}$) as the sum of an OFF time ($t_{OFF}$) and $t_{ON}$.

In step 610, control determines whether PS is transitioning from ON to OFF. If PS is not transitioning from ON to OFF, control continues in step 612. If the PS is transitioning from ON to OFF, control continues in step 614. In step 612, control determines whether $t_{ALL}$ is greater than a threshold time limit ($t_{LIM}$). If $t_{ALL}$ is greater than $t_{LIM}$, control continues in step 616. If $t_{ALL}$ is not greater than $t_{LIM}$, control continues in step 618. In step 616, control sets a temporary ratio ($\alpha_{TEMP}$) equal to the ratio of $t_{ON}$ to $t_{ALL}$. In step 618, control sets $\alpha_{TEMP}$ equal to the ratio between $t_{ON}$ and $t_{LIM}$. In step 620, control determines whether $\alpha_{TEMP}$ is greater than $\alpha$. If $\alpha_{TEMP}$ is greater than $\alpha$, control updates $\alpha$ in step 622 by setting $\alpha$ equal to $\alpha_{TEMP}$, and control continues in step 624. If $\alpha_{TEMP}$ is not greater than $\alpha$, control continues in step 624.

In step 614, control sets PS equal to OFF. In step 626, control determines whether $t_{ALL}$ is greater than or equal to $t_{LIM}$. If $t_{ALL}$ is not greater than or equal to $t_{LIM}$, control continues in step 630. If $t_{ALL}$ is greater than or equal to $t_{LIM}$, control sets $\alpha$ equal to the ratio of $t_{ON}$ to $t_{ALL}$ and resets $t_{ON}$ and $t_{OFF}$ in step 628. In step 630, control stores the run time ($t_{RUN} = t_{ON}$), $t_{OFF}$ and ratio data, and sets $t_n$ equal to zero.

In step 624, control calculates $Y_{operating}$ based on $Y_{thr}$, $\alpha$ and an offset ($k_{OFFSET}$) according to the following relationship:

$$Y_{operating} = \alpha Y_{thr} + k_{OFFSET} \quad [11]$$

$k_{OFFSET}$ provides a means for maintaining idle life targets and thus the cell set-point voltage within a manageable range and $Y_{thr}$ is the system design life. Control determines whether $Y_{operating}$ is greater than $Y_{thr}$ in step 632. If $Y_{operating}$ is greater than $Y_{thr}$, control continues in step 634. If $Y_{operating}$ is not greater than $Y_{thr}$, control continues in step 636. In step 634, control sets $Y_{operating}$ equal to $Y_{thr}$ and continues in step 638. In step 636, control determines whether $Y_{operating}$ is less than a minimum threshold ($Y_{thrmin}$). If $Y_{operating}$ is less than $Y_{thrmin}$, control sets $Y_{operating}$ equal to $Y_{thrmin}$ in step 640 and continues in step 638. If $Y_{operating}$ is not less than $Y_{thrmin}$, control continues in step 638.

In step 638, control determines whether PS is ON. If PS is not ON, control continues in step 642. If PS is ON, control continues in step 644. In step 642, control calculates $Y_{idle}$ based on α, $Y_{operating}$ and $Y_{proj}$, in accordance with equation 8, described above and control continues in step 644. In step 644, control determines $V_{lim}$ in accordance with equation 10, described above and control ends. The electrical systems 20,40 are operated to limit the voltage of the ultra-capacitor to $V_{lim}$ to provide a minimum life greater than $Y_{operating}$ during operating periods and to provide a life greater than $Y_{idle}$ during idle periods.

In step 606, control determines whether PS is transitioning from OFF to ON. If PS is not transitioning from OFF to ON, control ends. If PS is transitioning from OFF to ON, control sets PS equal to ON in step 646. In step 648, control retrieves $t_{OFF}$, $t_{RUN}$, α and $V_{lim}$ from memory. Control sets $t_{OFF}$ equal to the sum of $t_{OFF}$ and $t_n$ in step 650. In step 652, control sets $t_n$ equal to zero and control ends.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An electrical system that is operable to selectively provide electrical power to power a load, comprising:
   an ultra-capacitor that selectively stores and discharges electrical power; and
   a control module that determines an operating ratio based on an ON power state and an OFF power state of said ultra-capacitor, that calculates a voltage limit of said ultra-capacitor based on said operating ratio and that regulates operation of said ultra-capacitor based on said voltage limit.

2. The electrical system of claim 1 wherein said control module calculates said voltage limit based on a target life expectancy ($Y_{target}$).

3. The electrical system of claim 2 wherein said $Y_{target}$ is equal to one of a minimum allowed life expectancy ($Y_{operating}$) and a minimum needed life expectancy ($Y_{idle}$) based on said power states of said ultra-capacitor.

4. The electrical system of claim 1 wherein said control module calculates a temporary ratio as a ratio between an operating time and a total time, wherein said operating ratio is set equal to said temporary ratio if a previous value of said operating ratio is less than said temporary ratio.

5. The electrical system of claim 1 wherein said control module calculates a temporary ratio as a ratio between an operating time and a time threshold, wherein said operating ratio is set equal to said temporary ratio if a previous value of said operating ratio is less than said temporary ratio.

6. The electrical system of claim 1 further comprising a temperature sensor that is responsive to a temperature of said ultra-capacitor, wherein said voltage limit is calculated based on said temperature.

7. The electrical system of claim 1 wherein said control module determines whether a power state of said ultra-capacitor is transitioning from said ON state to said OFF state and calculates said operating ratio as a ratio between an operating time and a total time when said power state is transitioning from said ON state to said OFF state and said total time is greater than a threshold time.

8. A method of increasing operating voltage range and energy storage capacity of an ultra-capacitor, comprising:
   determining an operating ratio based on an operating period and a non-operating period of said ultra-capacitor;
   calculating a voltage limit of said ultra-capacitor based on said operating ratio; and
   regulating operation of said ultra-capacitor based on said voltage limit.

9. The method of claim 8 wherein said voltage limit is determined based on a target life expectancy ($Y_{target}$).

10. The method of claim 9 wherein said $Y_{target}$ is equal to one of a minimum allowed life expectancy ($Y_{operating}$) and a minimum needed life expectancy ($Y_{idle}$) based on a power state of said ultra-capacitor.

11. The method of claim 8 further comprising calculating a temporary ratio as a ratio between an operating time and a total time, wherein said operating ratio is set equal to said temporary ratio if a previous value of said operating ratio is less than said temporary ratio.

12. The method of claim 8 further comprising calculating a temporary ratio as a ratio between an operating time and a time threshold, wherein said operating ratio is set equal to said temporary ratio if a previous value of said operating ratio is less than said temporary ratio.

13. The method of claim 8 further comprising monitoring a temperature of said ultra-capacitor, wherein said voltage limit is calculated based on said temperature.

14. The method of claim 8 further comprising:
   determining whether a power state of said ultra-capacitor is transitioning from an ON state to an OFF state; and
   calculating said operating ratio as a ratio between an operating time and a total time when said power state is transitioning from said ON state to said OFF state and said total time is greater than a threshold time.

15. The method of claim 8 further comprising determining whether said power state is transitioning from said ON state to said OFF state.

16. The method of claim 15 further comprising calculating a temporary ratio as a ratio between an operating time and a total time when said power state is not transitioning from said ON state to said OFF state, wherein said operating ratio is set equal to said temporary ratio if a previous value of said operating ratio is less than said temporary ratio.

17. The method of claim 15 further comprising calculating a temporary ratio as a ratio between an operating time and a time threshold when said power state is not transitioning from said ON state to said OFF state, wherein said operating ratio is set equal to said temporary ratio if a previous value of said operating ratio is less than said temporary ratio.

18. The method of claim 15 further comprising calculating said operating ratio as a ratio between an operating time and a total time when said power state is transitioning from said ON state to said OFF state and said total time is greater than a threshold time.

19. A method of increasing operating voltage range and energy storage capacity of an ultra-capacitor, comprising:
   determining whether a power state of said ultra-capacitor is one of an ON state and an OFF state;
   calculating an operating ratio of said ultra-capacitor based on said power state;
   calculating a voltage limit of said ultra-capacitor based on said operating ratio; and regulating operation of said ultra-capacitor based on said voltage limit.

20. The method of claim 19 wherein said voltage limit is determined based on a target life expectancy ($Y_{target}$).

21. The method of claim 20 wherein said $Y_{target}$ is equal to one of a minimum allowed life expectancy ($Y_{operating}$) and a minimum needed life expectancy ($Y_{idle}$) based on said power state of said ultra-capacitor.

22. The method of claim 21 wherein $Y_{target}$ is equal to $Y_{operating}$ when said power state is ON and $Y_{target}$ is equal to $Y_{idle}$ when said power state is OFF.

23. The method of claim 19 further comprising monitoring a temperature of said ultra-capacitor, wherein said voltage limit is calculated based on said temperature.

* * * * *